Figure 11:
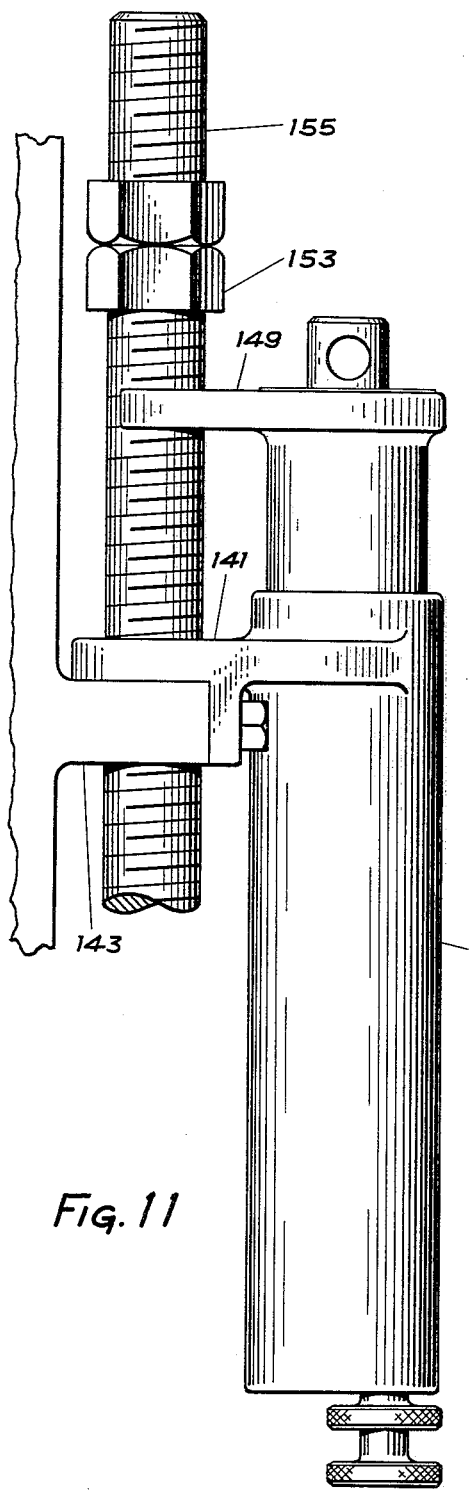

Sept. 11, 1962  R. E. DESCHNER  3,053,120
CONTROL MECHANISM FOR RECIPROCATING
TOOL FEEDING DEVICES
Filed Aug. 30, 1960  3 Sheets-Sheet 1
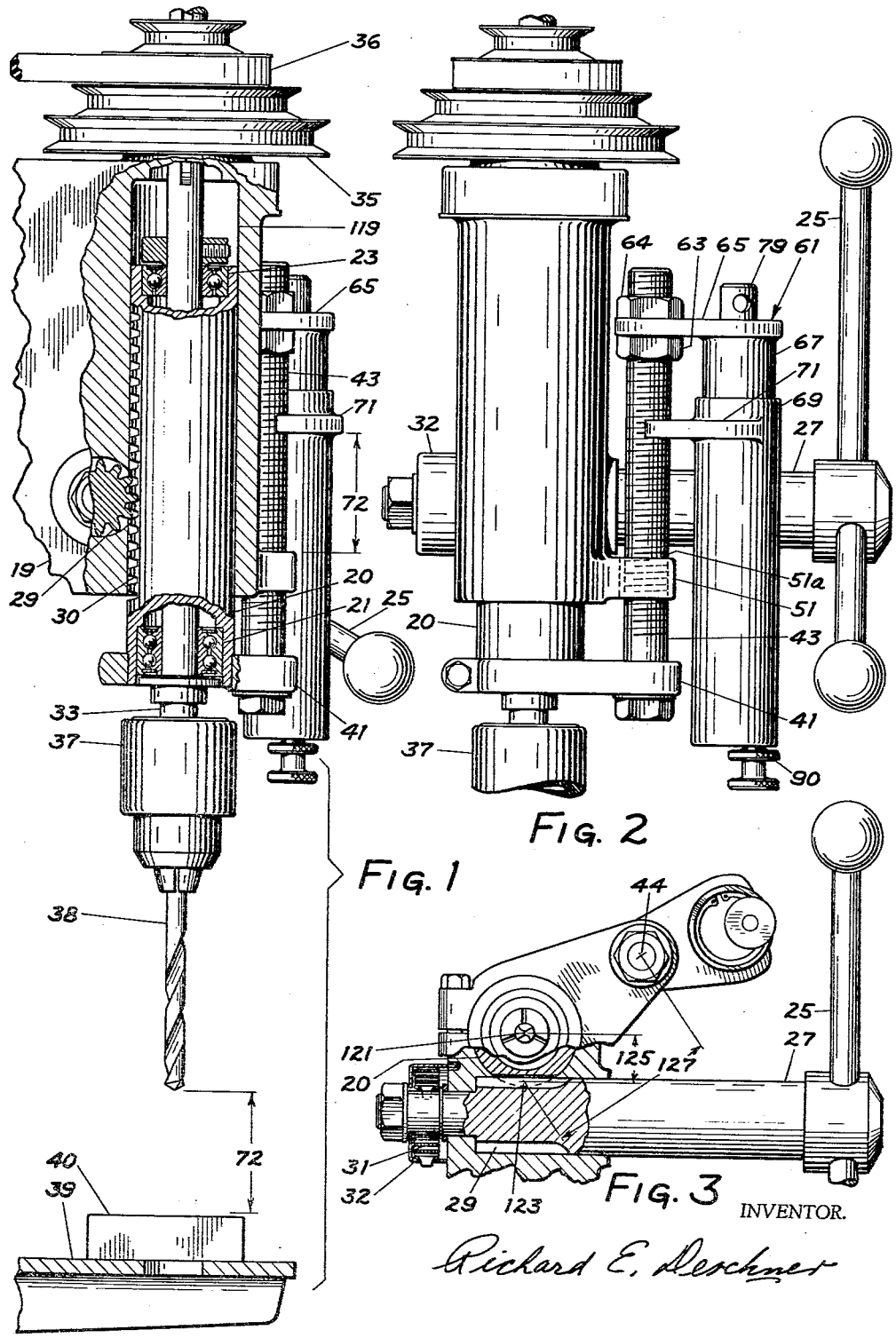
INVENTOR.
Richard E. Deschner Sept. 11, 1962 R. E. DESCHNER 3,053,120
CONTROL MECHANISM FOR RECIPROCATING
TOOL FEEDING DEVICES
Filed Aug. 30, 1960 3 Sheets-Sheet 2
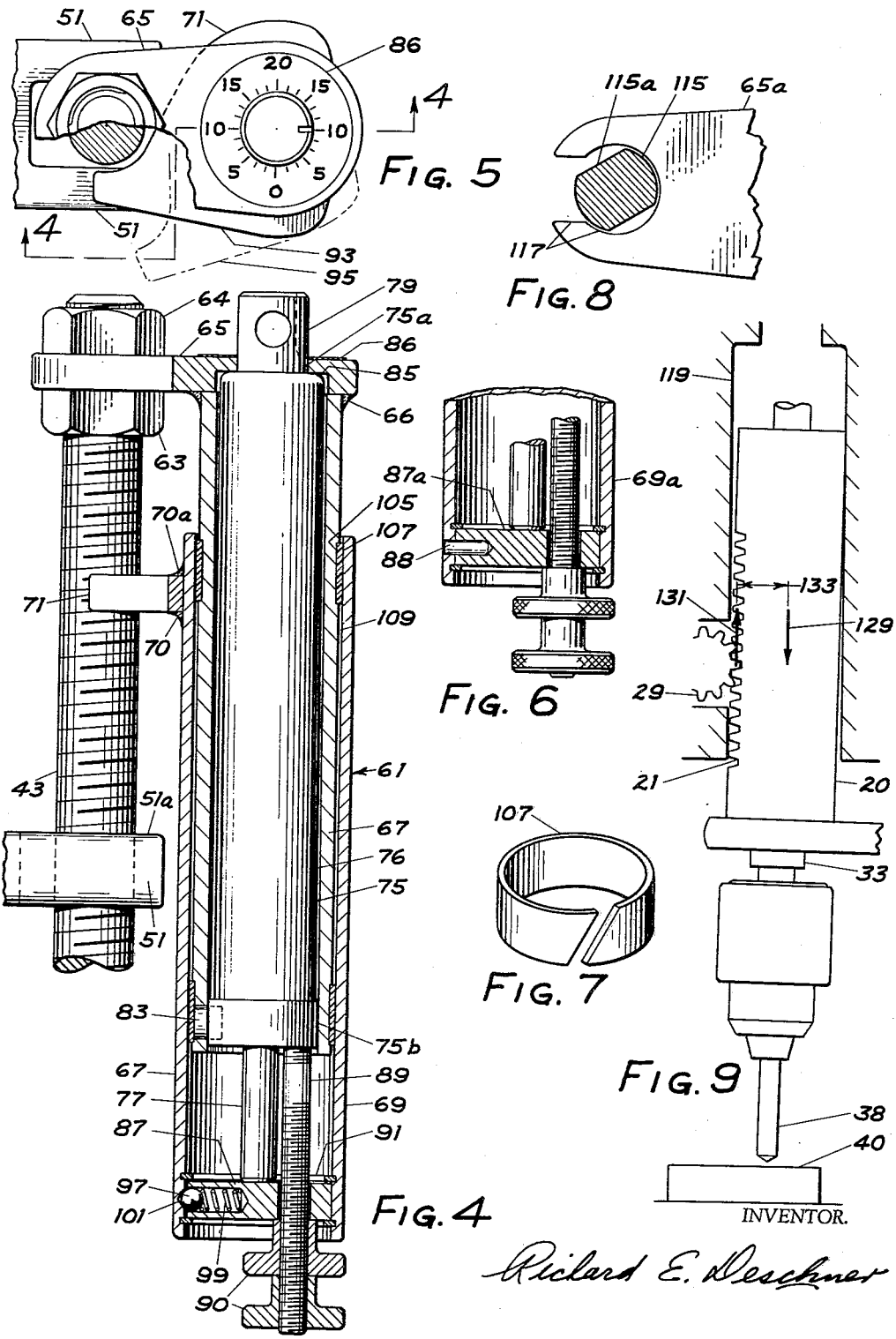
INVENTOR.
Richard E. Deschner Sept. 11, 1962

R. E. DESCHNER 3,053,120

CONTROL MECHANISM FOR RECIPROCATING
TOOL FEEDING DEVICES

Filed Aug. 30, 1960

3 Sheets-Sheet 3

INVENTOR.

Richard E. Deschner

United States Patent Office 3,053,120
Patented Sept. 11, 1962

3,053,120
CONTROL MECHANISM FOR RECIPROCATING
TOOL FEEDING DEVICES
Richard E. Deschner, 5550 Harcross Drive,
Los Angeles 43, Calif.
Filed Aug. 30, 1960, Ser. No. 52,818
8 Claims. (Cl. 77—33.5)

This invention relates to improvements in mechanisms for controlling the speed of travel of reciprocating tool feeding devices.

Many of the machines used in industry include reciprocating devices which feed tools to a work area for the purpose of working, shaping, moving, or transforming material. Examples of such devices can be found in assembly machines, arbor presses, drill presses and special purpose machines that are designed and built by industrial plants for their own use.

When a tool is being fed, the rate of feed is of primary importance. In the drill press for example, feed must be carefully controlled to protect small drills from breakage. Again, in the drill press, control is necessary to prevent drills from snagging as they break through the bottom of the workpiece, because at the breakthrough point a drill often pulls itself through too quickly, and it may break itself off, or snag out a large chunk of metal and produce a misshapen hole, or it may stall the drill press and stop the operation. The rate at which reaming tools are fed must also be controlled to produce smooth holes.

Control of feed is often unsatisfactory at the breakthrough point. A manual operator has difficulty controlling feed at breakthrough because at this point the drill often jerks out of his control and snags in the hole before he can act to reverse his effort and hold back on the feed mechanism. The manual operator's difficulty is magnified if the feed mechanism has considerable backlash (lost motion). Similarly, various types of hydraulic control units used on pneumatically fed drill presses, are often unable to control feed properly at breakthrough. This is due to such units being connected through a rack and first pinion to the pinion shaft of the drill press, which in turn carries a second pinion meshed to a rack on the drill press spindle sleeve, and backlash in the two gear systems permits the drill to jerk away from the control of the hydraulic unit at breakthrough.

In a drill press, a plunger or sleeve is slidable in the frame and guides the rotating spindle and tool. Looseness of the plunger in its slide bearing is found in many drill presses and causes inconstant lateral alignment of the tool as it is fed to the workpiece. This in turn causes holes to be drilled in the wrong location, and causes oversize holes, tool chatter, etc. as will be explained in more detail later.

It is therefore an important object of this invention to provide a control mechanism applicable to plunger type tool feeding devices for controlling the feed rate, which gives positive, tight axial control of the slidable plunger regardless of backlash in the feed mechanism.

It is another important object of this invention to provide a control mechanism applicable to plunger type tool feeding devices, which is capable of controlling the feed rate and simultaneously holding the plunger firmly aligned laterally during the feed stroke of the tool.

A further important object is to provide a versatile control unit for regulating the feed rate of drill presses, which will operate smoothly and efficiently with a full range of loads from 10 lbs. to at least 1500 lbs., these being the minimum and maximum feed loads ordinarily required.

Still another important object is to provide a compact, portable feed control unit which is directly attachable to a majority of drill presses as they are built at present without the necessity for alteration of the drill presses or installation of mounting brackets.

A still further object is to provide a handy feed control unit which can be installed on a drill press within one minute or removed therefrom in the same time, thus keeping the drill press quickly available for use with or without control, and permitting the unit to be quickly interchanged from one drill press to another.

Another object of this invention is to provide a control unit which may be mounted on the stop shaft of a drill press, and which is light enough in weight to be lifted through the drill press return stroke by the spindle-return spring of the drill press.

Yet another object is to provide a small size feed control unit which will provide control at any point desired in the stroke of a drill press, without interfering with normal use of the handlevers and stop shaft of the drill press.

Still another object is to provide a simplified control unit which may be mounted adjacent the reciprocative shaft of a tool feeding device to be operated thereby, and which may be quickly engaged and disengaged from said shaft while remaining mounted.

Yet another object is to provide a sturdy portable control unit which can withstand rough handling in shops without being damaged, and which may be easily disassembled for cleaning or for replacement of parts.

Other objects and advantages will be apparent from the following detailed description of preferred and alternate embodiments of the invention as illustrated in the accompanying drawings forming a part of this specification.

In the drawings,

FIG. 1 is a fragmentary side elevation of the front portion of a drill press equipped with the preferred embodiment of the invention as now reduced to practice, the structure being partially broken away to expose the interior construction of the drill press, FIG. 2 is a fragmentary front elevation of FIG. 1, FIG. 3 is a bottom plan view of FIG. 2, a portion of the structure being broken away to expose the actuating mechanism of the drill press, FIG. 4 is a substantially mid-sectional view of the control unit of the invention attached to the stop shaft of a drill press, the view taken on zig-zag line 4—4 of FIG. 5, FIG. 5 is a top plan view of the complete control unit attached to the stop shaft of a drill press, a portion of the upper cantilever being broken away to show engaged and disengaged positions of the lower cantilever.

Figure 10:
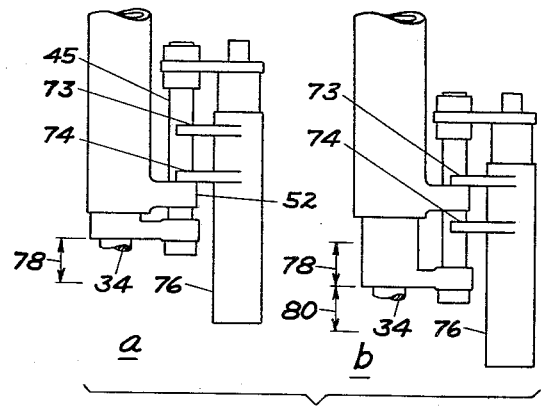
Figure 12:
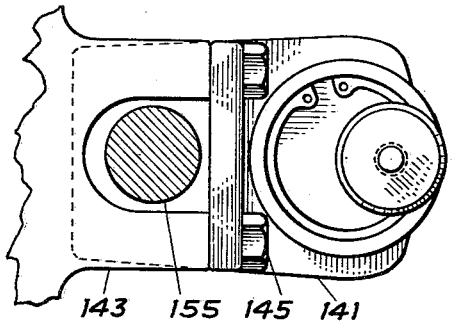

FIG. 6 is a fragmentary mid-sectional view of the lower end of a control unit similar to that of FIG. 4 but showing an alternate structure, FIG. 7 is a perspective view of one of the bearing rings per se as used in the control unit, FIG. 8 is a fragmentary plan view of a portion of the control unit of the invention and the stop shaft of a drill press, FIG. 9 is an exaggerated diagrammatic sectional elevation of a portion of a drill press, FIG. 10 is a diagrammatic elevation of a control unit with an alternate type of configuration, the control unit being shown in two different operating positions with a fragmentary portion of a drill press, FIG. 11 is an elevation of the control unit showing an alternate type of mounting, FIG. 12 is a bottom plan view of FIG. 11.

In the preferred embodiment of the invention as now reduced to practice and as illustrated in FIGS. 1–5, FIGS. 1–3 show the invention installed on a drill press having a frame 19, a slidable plunger including a sleeve 20 and bearings 21 and 23, and a linear actuating mechanism for the sleeve including handlevers 25 and pinion shaft 27. The actuating mechanism also includes a pinion 29 which is formed integral with pinion shaft 27 to mesh with rack teeth 30 provided on sleeve 20. A torsional spindle-return spring 31 enclosed in cover 32, is engaged with pinion shaft 27 to return sleeve 20 after a downward stroke. A rotatable spindle 33 is mounted without end play in bearings 21 and 23 and is arranged to be driven through a step pulley 35 by a V-belt 36. Spindle 33 carries chuck 37 which is adapted to hold a drill 38 or other rotary tool, and table 39 supports workpiece 40. A bracket 41 is fastened to sleeve 20 and extends laterally outward therefrom, supporting a stop shaft 43 and constraining the same to travel with sleeve 20. FIG. 2 shows a stop lug 51 having a stop surface 51a, said lug being supported by the frame and positioned in a closely spaced relationship with a portion of the length of stop shaft 43. With the exception of drill 38 and workpiece 40, the parts described in this paragraph are standard equipment on any drill presses.

A specially constructed control unit 61 is a novel and important feature of the present invention and is provided for controlling the feed rate of stop shaft 43, sleeve 20, and tool 38. In FIGS. 1–2 the unit is shown positioned to start control after the spindle has been fed downwardly through distance 72, when tool 38 is about to enter workpiece 40. The control unit is attached to stop shaft 43 by stop nuts 63 and 64 which form a one point support for the unit, upper nut 64 acting as a stop collar on shaft 43 as will be mentioned again later. The said control unit includes an upper first cantilever member 65 held by said stop nuts and welded at 66 (see FIG. 4) to an inner casing 67. An outer casing 69 which is slidable over inner casing 67 is welded at 70 and 70a (see FIG. 4) to a lower second cantilever member 71 aligned for engagement with stop surface 51a.

When sleeve 20 (FIGS. 1–2) is moving downwardly to feed the drill 38, shaft 43 travels through its working stroke, moving stop collar 64 toward stop surface 51a. After lower cantilever 71 engages with stop surface 51a, continued movement of sleeve 20 downwardly causes the two cantilevers 65 and 71 to be forced together causing relative movement between the casings.

Within casings 67 and 69, adjustable check means is provided to resist relative movement of the casings so that the rate of travel of sleeve 20 can be regulated. FIG. 4, which illustrates the control unit in detail, shows one type of check means which may be used. It comprises a hydraulic cartridge 75 having a reciprocative plunger or piston rod 77 at its lower end and a rotatable speed adjustment knob 79 at its upper end. This cartridge is preferably of the type illustrated in patent application Serial No. 754,436 filed August 11, 1958, which may be constructed with a large range of action to make the control unit adequate for controlling loads from 10 lbs. to 1500 lbs.

Cartridge 75 is secured from rotational or axial movement relative to casing 67 by a key member 83, upward thrust on the cartridge being resisted by shoulder 85, and adjustment torque applied to knob 79 being resisted by said key member. Knob 79 projects through upper cantilever member 65 where dial 86 is provided to give visual indication of the knob setting. The cartridge 75 is supported radially at only two end areas 75a and 75b, the major portion of the length of the cartridge being separated from the inner diameter of casing 67 by a clearance space 76 so that bending of casing 67 as described later herein, will not distort the cartridge. Piston rod 77 bears against a disc 87 which forms a laterally extending thrust member, and which is held from moving either downwardly or rotationally by a threaded adjustment rod 89 fastened to the cartridge and supporting adjustable collar means consisting of nuts 90. Piston rod 77 permits upward movement of disc 87 but resists such movement in a measure determined by the setting of adjustment knob 79. Disc 87 is fastened to outer casing 69 by snap rings 91 but fits loosely enough to be swivelable in casing 69.

During a working stroke of the drill press, stop shaft 43 moves downwardly. After lower cantilever 71 contacts stop surface 51a, continued movement of the stop shaft first causes the casings to cant relative to each other, while piston rod 77 slides laterally on disc 87 until all lost motion is taken up, then disc 87 forces piston rod 77 inwardly. The arrangement of parts which permits the lateral sliding of piston rod 77 on disc 87 is an important feature of the invention because it prevents canting forces as great as 1500 lbs. at the cantilevers from being transmitted to piston rod 77. Such forces otherwise would damage the piston rod bearing and fluid seal. When the piston rod reaches the limit of its travel, it stops movement of shaft 43, and this in turn stops the working stroke of the drill press. After the working stroke is completed and stop shaft 43 is raised, piston rod 77 is returned outwardly by a spring inside cartridge 75, and cantilevers 65 and 71 are moved axially apart by the force of said piston rod and by gravity acting on outer casing 69.

An important feature of the control unit lies in the adjustable stop means which is provided for regulating length of stroke of the control unit. It is seen from the foregoing explanation that the retarding action of the control unit is transmitted through stop shaft 43 to give a controlled feed stroke for tool 38. The length of the controlled feed stroke is determined by the length of stroke of the control unit, and this in turn is determined by the amount of axial separation of cantilevers 65 and 71 before a working stroke. FIG. 4 shows that disc 87, rod 89 and stop nuts 90 form adjustable stop means for limiting the amount of separation of said cantilevers to determine stroke settings for the control unit.

Another important feature of the control unit which is shown in FIGS. 4–5, permits the unit to be temporarily disengaged from action while retaining a previous stroke setting and while still mounted on the stop shaft. This advantage is accomplished by having the casings rotatable relative to each other, and by constructing the aforementioned adjustable stop means so that relative rotation of the casings does not disturb the stroke setting. The control unit is disengaged from action when lower cantilever 71 is pivoted from position 93 to position 95 since it is then moved out of engagement alignment with stop lug 51. This movement rotates outer casing 69, but since thrust disc 87 is swivelable within casing 69 and is held from rotating by rod 89, the stroke setting of nuts 90 is undisturbed.

FIG. 4 shows that the additional feature of a detent may be incorporated in the control unit to hold lower cantilever 71 positively in or out of engagement alignment. To accomplish this, disc 87 is provided with a detent ball 97 urged outwardly by spring 99 to engage with one or more depressions 101 in outer casing 69. A "reciprocative detent structure" is thus formed by rod 89, disc 87 and ball 97 and their supporting elements, and it is adapted to hold lower cantilever 71 rotatably positioned regardless of its axial stroke position.

As shown in the diagrammatic elevation FIG. 10, the utility of the control unit may be increased by provision of two or more cantilevers 73 and 74 on the outer casing 76 to increase the stroke range. With the parts positioned as in FIG. 10a, the control unit will regulate the travel of drill press spindle 34 through distance 78. If now the spindle be held vertically stationary while outer casing 76 is rotated to disengage cantilever 74 from lug 52 (disengagement position not shown), the control unit will extend itself, and outer casing 76 may then be rotated to engage cantilever 73 with lug 52 as shown in FIG. 10b. The control unit will now regulate the movement of spindle 34 through distance 80. It will be seen that this arrangement permits the control unit to regulate the speed of travel of stop shaft 45 through a stroke length greater than that of the control unit while the mounting of the control unit remains undisturbed.

For some uses, a control unit is preferred with the cantilevers locked in permanent alignment to facilitate mounting the control unit quickly on the stop shaft. FIG. 6 shows an alternate structure which accomplishes this by having disc 87a immovably fastened to outer casing 69a by a pin 88.

In FIG. 4 inner casing 67 is shown provided with grooves 105 carrying bearing rings 107 which slidably support outer casing 69, there being considerable radial clearance provided at 109 between the casings. In FIG. 7 one of the bearing rings per se is shown to be split for ease of assembly. The bearing rings are preferably made of nylon or other resilient material which requires no lubrication. The arrangement of the resilient bearing rings along with the generous amount of radial clearance 109 between casings, is an important feature of the present invention. By means of the clearance, the light weight casings are permitted to bend under load without rubbing and binding on each other, while the bearing rings, being resilient, are able to change shape enough to accommodate the bent casings and yet carry the full radial loads required. The result is that the casings move smoothly relative to each other without any stick-slip action under any load within the capacity of the device.

In FIG. 4, if a round hole is provided in cantilever member 65, the top nut 64 must be removed from the stop shaft if the control unit is to be installed or removed. FIG. 8 shows an alternate construction in which stop shaft 115 is formed with two flat sides 115a, and the cantilever member 65a is provided with an opening 117 shaped to accept the shaft and to retain the same therein when the cantilever member is rotated a few degrees. Both cantilever members may be provided with similar openings to permit the control unit to be mounted on the stop shaft 115 or removed therefrom without removal of either of the stop shaft nuts. A high degree of convenience in installation is thereby assured for the control unit.

Important features of light weight and small size are given to the control unit by the particular construction of the cantilever members and casings. As shown in FIG. 4, both cantilever members 65 and 71 may be formed of plate material and welded to their respective tubular casings at 66, and 70 and 70a. This arrangement permits the cantilever members to be made of relatively thin but strong heat treated steel for minimum weight. The casings are made of thin-walled metallic tubing which is light in weight and inexpensive and permits the casing to perform four dierent functions. First, they form a dirt-proof enclosure for the check means, second, they form moderately sized light weight structural members which efficiently resist the bending action due to the heaviest forces applied through the cantilevers, third, they support sliding surfaces which permit relative axial movement between the cantilevers, and fourth, they permit relative rotation of the cantilevers.

The light weight given to the control unit by its particular construction, facilitates its use on a drill press stop shaft because it permits the spindle-return spring 31 (FIG. 3), which is original equipment on most drill presses, to lift the light weight control unit as it lifts the spindle.

The small size given to the control unit by its particular construction permits it to be mounted on stop shaft 43 without interfering with the use of said shaft as a stop means for the drill press spindle, nor does it interfere with the use of the drill press hand levers 25. The particular construction of the control unit makes it portable, inexpensive to fabricate, handy to install, and convenient to disassemble for cleaning.

FIGS. 11–12 show an alternate construction of the invention wherein the mounting of the control unit is made semi-permanent. This is accomplished by having lower cantilever member 141 secured to stop lug 143 by screws 145 so that outer casing 147 remains stationary relative to the drill press frame while upper cantilever member 149 is engageable with stop nut 153 to control the rate of travel of stop shaft 155. It was explained how the control unit of FIGS. 4–5 could be temporarily disengaged from action by rotating the lower cantilever member out of engagement alignment with the stop lug. Similarly the unit shown in FIG. 11 may be disengaged by rotating the upper cantilever 149 out of engagement alignment with stop nut 153 (disengagement position not shown). To permit this, the outer end of cantilever 149 could be shaped similarly to cantilever 71 of FIG. 5.

*Operation*

It will be seen from FIG. 1 that when hand operated lever 25 is rotated clockwise, pinion 29 moves sleeve 20 downwardly to feed drill 38 through workpiece 40. In high production drilling, considerable feeding pressure is brought to bear on the handlever to speed the drilling process. When a drill which is being fed under high pressure starts breaking through the lower side of a workpiece, it catches in the metal or "snags" and the helical grooves act like a screw thread to feed the drill through much more quickly than it had been fed to that point. Often in such instances a drill will break, or will gouge out too much material and cause a misshapen hole. In other instances the drill press may be stalled.

A skilled manual operator who is feeding a drill under high pressure, holds the feed lever firmly and tries to reverse his effort at the handlever at just the right time to prevent snagging at breakthrough. This means that under high pressure drilling, he must be constantly alert. Adding to his difficulty, as may be seen from FIG. 1, is the possibility that if much backlash (lost motion) exists between pinion 29 and rack teeth 30, the drill can jump through the workpiece, pulling spindle 33 and sleeve 20 far enough ahead of the handlever to snag in the work in spite of the operator's attention.

A novel and important advantage of the present invention will now be seen to result from positioning the control unit 61 to be operated by stop shaft 43 (FIGS. 1–2). By this arrangement, the control unit is connected positively to sleeve 20 so that axial movement of sleeve 20 is controlled positively without any lost motion, regardless of backlash between pinion 29 and rack 30. With the spindle being axially tight in its bearings, tool 38 is positively prevented from jerking out of control to snag in the workpiece. In addition, the operator is freed of having to give his full attention to the drilling operation.

FIGS. 1–3 show sleeve 20 slidably supported in frame 19. If the fit of sleeve 20 in bore 119 is loose, as it will be found to be in many drill presses, the tool is fed to the workpiece in three different lateral alignments during its downward stroke. This will be understood from FIGS. 3 and 9. In FIG. 3 it is seen that the center line 121 of the tool is laterally spaced from the contact point 123 (between sleeve and pinion) a distance 125, while the center line of stop shaft 43 at 44 is spaced from contact point 123 a distance 127. In the exaggerated diagrammatic view, FIG. 9, heavy arrows 129 and 131 indicate that while tool 38 is being fed downwardly toward the work, sleeve 20 is acted upon by a force couple consisting of the weight of sleeve 20 and spindle 33 at 129, opposed to the supporting force of pinion 29 at 131, the forces being separated by distance 133. This first force couple cocks the sleeve in bore 119 throwing tool 38 toward the left as seen in FIG. 9. Next, after the tool contacts workpiece 40, sleeve 20 is pushed downwardly by pinion 29 and upwardly by the tool so that the first force couple is reversed to form a second force couple which cocks the sleeve the opposite way, throwing the tool toward the right as viewed in FIG. 9. Lastly when the end of the operation is reached and sleeve 20 is stopped by stop shaft 43 (FIGS. 2–3), a third force couple comes into play. It consists of the force of pinion 29 opposed by that of the stop shaft, the forces being separated by distance 127 (FIGS. 3). The third force couple cocks sleeve 20 forcing the tool away from the reader as viewed in FIG. 9.

Inconstant alignment of the tool during the feed stroke as described above, results in the tool first contacting the workpiece at one position; next, slipping on the workpiece toward the front of the drill press when feeding pressure is applied; finally, pushing toward one side of the drill press when the stopping point is reached. This series of actions produces a variety of unsatisfactory results depending on the type of tool being fed, drills being caused to start holes in wrong locations, reamers being caused to make enlarged holes, and countersinks and unpiloted spot-facing tools being caused to chatter and produce rough work, etc.

Another novel and important advantage of the invention will now be seen to result from positioning the control unit 61 to be operated by stop shaft 43. With this arrangement, the control unit may be set to maintain the third cocking couple on sleeve 20 during an entire feeding stroke. The first and second couple, being lesser than the third are nullified, sleeve 20 being held tightly in slide bearing 119 (FIG. 1) to give constant alignment to the tool during the entire feeding stroke. It has been proven by test that with heavy feeding pressure, the control unit can be set thus to hold the sleeve so rigidly during the feeding stroke, that a drill press with a very loose sleeve may be used to perform operations of cutting accurate vertical grooves in metal with end mill cutters or single point fly cutters. This type operation is known as interrupted cut machining and is otherwise next to impossible with a loose sleeve drill press because of misalignment and tool chatter caused by looseness of the sleeve.

A still further advantage results from positioning the control unit to be operated by stop shaft 43. This arrangement makes the control unit accessible to the drill press operator and thereby facilitates the drilling of small diameter deep holes which require the drill to be lifted for chip removal before the hole is finished. To protect small drills, the control unit is set to regulate the feed thoughout the full depth of the hole. Whenever the drill is lifted for chip removal before the hole is finished, the cantilevers are held together by the operator with the fingers of his left hand while the drill is raised and lowered with his right. Thus he keeps the control unit from extending so it resumes control at the proper point each time the drill is reinserted in the hole. The control unit is very handy to use in this way. In actual high production drilling of small diameter deep holes, an operator lifts and lowers the drills many times in each hole. He does this rapidly, keeping the fingers of his left hand in place on the cantilevers as described until each hole is completed.

It should be understood that the present disclosure is for the purpose of illustration only, and that this invention includes all modifications and equivalents which come within the scope of the subject matter claimed.

What is claimed is:

1. A control unit for regulating the rate of travel of a reciprocative shaft attached to a tool feeding device, said shaft carrying a stop collar and traveling proximate to a laterally extending stationary stop surface; said control unit comprising: an elongated cylindrical inner casing, a cylindrical outer casing enclosing a portion of the length of said inner casing and being slidable thereon, adjustable check means within said casings providing variable resistance to axial movement of said casings relative to each other, and means for regulating the travel of said stop shaft through a stroke greater than that of said control unit, said means comprising a cantilever member fastened to said inner casing and extending laterally thereof, a plurality of laterally extending thrust surfaces supported on said outer casing, and spaced apart axially thereof, said cantilever and thrust surfaces being engageable with said stop collar and stop surface when held in alignment therebetween, said cantilever being reciprocative relative to said thrust surfaces, and said casings being rotatable relative to each other to permit said cantilever to remain in engagement alignment with said stop collar and said stop surface, while said thrust surfaces are selectively rotated into and out of engagement alignment with said stop collar and stop surface.

2. A control unit for regulating the rate of travel of a reciprocative shaft attached to a tool feeding device, said shaft operating proximate to a laterally extending stationary stop surface, said control unit being detachably mountable on said shaft to derive rigid support therefrom, said control unit comprising: an elongated cylindrical inner casing, a cylindrical outer casing enclosing a portion of the length of said inner casing and being slidable thereon, a first cantilever member fastened to said inner casing, a second cantilever member fastened to said outer casing, said cantilever members extending laterally from said casings, said first cantilever being attachable to said shaft, said second cantilever being engageable with said stop surface, said cantilevers being reciprocative relative to each other, adjustable check means within said casings providing variable resistance to axial movement of said cantilevers when they move relatively toward each other, said first cantilever member and said inner casing constituting a welded assembly wherein said first cantilever member comprises a substantially flat plate with one face held butted axially against one end of said inner casing by an arcuate weld extending circumferentially of said casing, and said second cantilever member and said outer casing constituting a welded assembly wherein said second cantilever member includes one concave arcuate end held butted radially against a portion of the circumference of said outer casing by an arcuate weld located on the circumference of said outer casing.

3. A control unit for regulating the rate of travel of a reciprocative shaft attached to a tool feeding device, said shaft carrying a stop collar and traveling proximate to a laterally extending stationary stop surface; said control unit comprising: an elongated inner casing, an outer casing enclosing a portion of the length of said inner casing and being slidable thereon, a first cantilever member fastened to said inner casing, a second cantilever member fastened to said outer casing, said cantilever members extending laterally from said casings and being engageable with said stop collar and stop surface when held in alignment therewith, said cantilevers being reciprocative relative to each other, adjustable check means within said casings providing variable resistance to axial movement of said cantilevers when they move relatively toward each other, stop means joined with said casings to limit the separation of said cantilevers when they move apart, said stop means being adjustable to vary the amount of said separation, said casings being rotatable relative to each other to permit one cantilever to remain in engagement alignment with said stop collar and said stop surface, while the other cantilever is rotated into and out of engagement alignment with said stop collar and stop surface, said adjustable stop means comprising a rod operatively joined with said inner casing and extending substantially parallel to the axis thereof, a thrust member swivelably secured to said outer casing and engaging a portion of the circumference of said rod to retain said thrust member substantially unmoved relative to said rod during relative rotation of said casings, and collar means carried by said rod for contacting said thrust member.

4. A control unit for regulating the rate of travel of a reciprocative shaft attached to a tool feeding device, said shaft carrying a stop collar and traveling proximate to a laterally extending stationary stop surface; said control unit comprising: an elongated inner casing, an outer casing enclosing a portion of the length of said inner casing and being slidable thereon, a first cantilever member fastened to said inner casing, a second cantilever member fastened to said outer casing, said cantilever members extending laterally from said casings and being engageable with said stop collar and stop surface when held in alignment therewith, said cantilevers being reciprocative relative to each other, adjustable check means within said casings providing variable resistance to axial movement of said cantilevers when they move relatively toward each other, stop means joined with said casings to limit the separation of said cantilevers when they move apart, said stop means being adjustable to vary the amount of said separation, said casings being rotatable relative to each other to permit one cantilever to remain in engagement alignment with said stop collar and said stop surface, while the other cantilever is rotated into and out of engagement alignment with said stop collar and stop surface, said adjustable stop means comprising a rod operatively joined with said inner casing and extending substantially parallel to the axis thereof, a thrust member swiveably secured to said outer casing and engaging a portion of the circumference of said rod to retain said thrust member substantially unmoved relative to said rod during relative rotation of said casings, collar means carried by said rod for contacting said thrust member, and detent means provided between said thrust member and said outer casing for disengageably holding said thrust member rotationally positioned relative to said outer casing.

5. A hydraulic control unit for controlling the rate of travel of a reciprocative shaft, said shaft forming part of a tool feeding device and operating proximate to a stationary stop surface, said control unit being detachably mountable on said shaft, said control unit comprising: an elongated inner casing, an outer casing enclosing a portion of the length of said inner casing and being slidable thereon, a first cantilever member secured to the inner casing and extending laterally therefrom, a second cantilever member secured to said outer casing and extending laterally therefrom, said first cantilever being attachable to said shaft to form a single rigid support for the control unit, said second cantilever being engageable with said stop surface to cause relative movement between said casings when said shaft reciprocates, and adjustable check means within said casings providing variable resistance to relative axial movement of said casings, said check means comprising: a self contained hydraulic unit having an elongated body provided with a reciprocative plunger at one end and a speed adjustment knob at the other, said plunger resisting axial movement relative to said body in an amount depending on the setting of said knob, said body being fastened within said inner casing with said adjustment knob exposed for accessibility, a thrust member fastened to said outer casing contacting the end of said plunger to move said plunger axially when said casings move axially relative to each other, said plunger being laterally slidable on said thrust member to minimize lateral loading of said plunger when said outer casing is canted relative to the inner casing during application of opposed forces to said cantilevers.

6. A control mechanism for controlling the rate of travel of a reciprocative shaft attached to a tool feeding device, said shaft operating proximate to a stationary stop surface, said control mechanism being detachably mountable on said shaft to receive rigid support from said shaft, said control mechanism comprising: an elongated inner casing, an outer casing enclosing a portion of the length of said inner casing and being slidable thereon, a first cantilever member secured to one of said casings and extending laterally therefrom, a second cantilever member secured to the other of said casings and extending laterally therefrom, said first cantilever being attachable to said shaft to form a single rigid support for the control unit, said second cantilever being engageable with said stop surface to cause relative movement between said casings when said shaft reciprocates, and adjustable hydraulic check means within said casings providing variable resistance to relative axial movement of said casings, said check means including a fluid damped reciprocative plunger and speed adjustment means therefor, a thrust member fastened within said casings contacting the end of said plunger and moving said plunger axially when said casings move axially relative to each other, said plunger being laterally slidable on said thrust member to minimize lateral loading of said plunger when said outer casing is canted relative to said inner casing during application of opposed forces to said cantilevers.

7. The subject matter of claim 6, said first cantilever being secured to said inner casing, and said thrust member being operatively joined with said outer casing.

8. In combination with a drill press having a toothed rack and pinion transmitting motion from a feed actuating means to a reciprocative tool carrying plunger, said plunger having a stop shaft attached thereto, there being a stationary stop surface proximate to said shaft, a control unit for preventing self feeding of said tool otherwise permitted by backlash between said rack and pinion, said control unit being detachably mountable on said reciprocative shaft and comprising: an elongated inner casing, an outer casing enclosing a portion of the length of said inner casing and being slidable thereon, a first cantilever member secured to one of the said casings and extending laterally therefrom, a second cantilever member secured to the other of said casings and extending laterally therefrom, said first cantilever being attachable to said shaft to form a single rigid support for the control unit, said second cantilever being engageable with said stop surface to cause relative movement between said casings when said shaft reciprocates, and adjustable hydraulic check means within said casings providing variable resistance to relative axial movement of said casings, said check means including a fluid damped reciprocative plunger and speed adjustment means therefor, a thrust member fastened within said casings contacting the end of said plunger and moving said plunger axially when said casings move axially relative to each other, said plunger being laterally slidable on said thrust member to minimize lateral loading of said plunger when said outer casing is canted relative to said inner casing during application of opposed forces to said cantilevers.

References Cited in the file of this patent
UNITED STATES PATENTS
2,863,339     Emrick ---------------- Dec. 9, 1958